Patented Nov. 27, 1951

2,576,306

UNITED STATES PATENT OFFICE 2,576,306

SUBSTITUTED IMIDAZOLIDINE COMPOUNDS AND METHOD FOR PREPARING THEM

Glen H. Morey, Terre Haute, Ind., assignor to Commercial Solvents Corporation, Terre Haute, Ind., a corporation of Maryland No Drawing. Application August 28, 1948, Serial No. 46,726

5 Claims. (Cl. 260—309.6)

This invention relates to the production of substituted imidazolidine compounds and a method for preparing them. More particularly it relates to the process for preparing substituted imidazolidines and to the compounds thus produced by reacting a diamine having one secondary amino group and one primary amino group with an aldehyde.

The diamine may have the following structural formula:

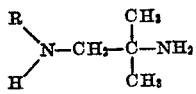

in which R may be alkyl, cycloalkyl, aryl, or aralkyl. Such groups include methyl, ethyl, propyl, butyl, amyl, etc.; cyclopentyl, cyclohexyl, etc.; phenyl tolyl, xylyl, etc.; or benzyl, tolyl, etc.

The aldehyde may be open chain, cyclic, or heterocyclic. Specific aldehydes include formaldehyde, acetaldehyde, propionaldehyde, butyraldehyde; benzaldehyde; naphthaldehyde; tolualdehyde, etc.; cyclohexylformaldehyde, cycloheptaldehyde, etc.

The product produced has the following structural formula:

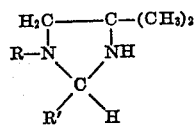

in which R may be an aliphatic radical, aryl, aralkyl, or cycloalkyl and R' is selected from the group consisting of hydrogen, alkyl, heterocyclic, and aryl radicals.

As examples of the new compounds included in the above formula may be mentioned: 1-ethyl-4,4-dimethylimidazolidine, 1-cyclohexyl-2-phenyl - 4,4 - dimethylimidazolidine, 1 - phenyl - 2-furyl - 4,4 - dimethylimidazolidine, 1 - phenyl-2 - (2' - furfuryl) - 4,4 - dimethylimidazolidine, 1 - isopropyl - 2 - methyl - 4,4 - dimethylimidazolidine, 1 - isopropyl - 2 - phenyl - 4,4 - dimethylimidazolidine and 1 - benzyl - 2 - methyl-4,4 - dimethylimidazolidine.

The process is carried out by reacting one mole of the diamine with one mole of aldehyde until condensation is substantially complete. The amount of aldehyde should not be more than approximately one mole per mole of diamine.

The reaction in general is exothermic and may be initiated at a temperature of about 25–50° C. In general, it should be carried out below about 125° C. It is usually desirable to cool the reaction vessel in order to control the reaction by maintaining the temperature in the range of about 35–50° C., at least during the early stages of the reaction. Atmospheric pressure is employed.

A suitable solvent may be used to maintain the constituents and the reactants in solution while the reaction is being carried out. Among these is methanol or other monohydric alcohol. In general, solvents which do not react with the constituents or products may be used.

In order to obtain results it is necessary that one of the amino groups be primary and one be secondary. If both amino groups are primary, resinous tarry substances of little or no utility are formed. However, when diamines of the type used in this invention, namely, having one amino group primary and one amino group secondary, the reaction can be controlled and products of a useful novel character are obtained in high yields.

The new products may be used in the production of plastics, for example, by reaction with phenol.

The following examples are given to illustrate my invention, but should not be construed as limiting it to the exact conditions shown:

Example I

A mixture was prepared containing 82 grams (0.5 mole) of N-(2-aminoisobutyl) aniline and 48 grams (0.5 mole) of furfural. This mixture was heated to remove water. The temperature was slowly increased during a 5 hour period to 110° C. Nine grams of water were removed. The product was distilled using a modified Claisen flask. After a small forerun 84.5 grams of a product distilled at 151–159° C. at 4 mm. Upon redistillation practically all this material distilled at 157–159° C. at 4 mm. The product was tested and found to be 1 - phenyl - 2 - (2' - furfuryl) - 4,4 - dimethylimidazolidine.

Example II 130 grams (1 mole) of N-(2-aminoisobutyl)-isopropylamine was placed in a flask fitted with a stirrer. 44 grams (1 mole) of acetaldehyde was slowly added with stirring. The mixture was kept cool in an ice bath. The mixture was then allowed to stand at room temperature for 108 hours. It was then warmed over steam for 1 hour. The water which had collected was removed by heating with $C_6H_6$ (benzene). 32 grams of the resulting product, boiling at 72–75° C. at 24 mm., was distilled off. It was found to be: 1-isopropyl, 2-methyl, 4,4-dimethyl imidazolidine.

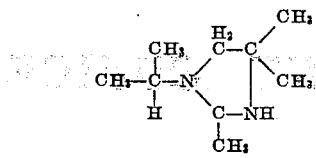

I claim as my invention:

1. A composition of matter comprising substituted imidazolidines having the formula:

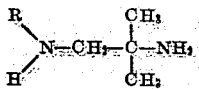

wherein R is a radical selected from the group consisting of alkyl and aryl and R' is a radical selected from the group consisting of alkyl and furfuryl radicals.

2. A composition of matter comprising 1-phenyl-2-(2'-furfural)-4,4-dimethylimidazolidine.

3. A composition of matter comprising a 1-alkyl-4,4-dimethylimidazolidine.

4. In the preparation of substituted imidazolidines the process which comprises reacting an aldehyde with an N-substituted ethylene diamine having the general formula

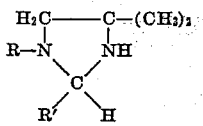

wherein R is a radical selected from a group consisting of alkyl and aryl radicals; said diamine and aldehyde being reacted in substantially equimolecular proportions and at temperatures within the range of from about 25° to 125° C.; and recovering the imidazolidine thereby produced.

5. The process of claim 4 wherein said aldehyde has the general formula

wherein R' is a radical selected from a class consisting of alkyl and furfuryl radicals.

GLEN H. MOREY.

REFERENCES CITED

The following references are of record in the file of this patent:

UNITED STATES PATENTS

| Number | Name | Date |
|---|---|---|
| 2,155,877 | Waldmann | Apr. 25, 1939 |
| 2,264,894 | Shoemaker | Dec. 2, 1941 |
| 2,416,042 | Brooks | Feb. 18, 1947 |
| 2,490,393 | Whetstone | Dec. 6, 1949 |

OTHER REFERENCES

Rameau: Rec. Trav. Chim., vol. 57, pp. 194-214 (1938).